June 23, 1970  D. S. ROSS  3,516,930
METHOD OF TREATING LIQUID WASTE EFFLUENT
Filed Aug. 4, 1969  2 Sheets-Sheet 1

INVENTOR.
DAVID S. ROSS
BY
Meyer, Tilberry & Body
ATTORNEYS.

INVENTOR.
DAVID S. ROSS

United States Patent Office 3,516,930
Patented June 23, 1970

1

3,516,930
METHOD OF TREATING LIQUID WASTE EFFLUENT
David S. Ross, Lorain, Ohio, assignor to Hydro-Clear Corporation, Avon Lake, Ohio, a corporation of Ohio
Continuation-in-part of application Ser. No. 633,458, Apr. 25, 1967. This application Aug. 4, 1969, Ser. No. 847,346
Int. Cl. B01d 15/06
U.S. Cl. 210—32    13 Claims

ABSTRACT OF THE DISCLOSURE

A method of treating liquid waste effluent containing large solids and dissolved and/or colloidal substances, which method involves introducing activated carbon in a body of effluent above a particulate filter bed and creating current above the surface of the bed to hold the activated carbon particles in suspension so they can absorb the dissolved and/or colloidal substances.

---

Figure 1:
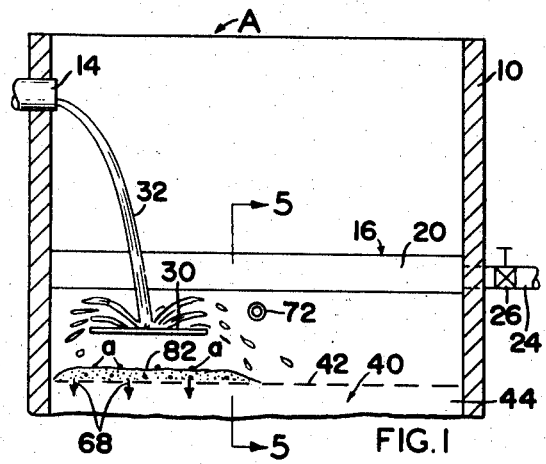

This application is a continuation-in-part application of my prior application Ser. No. 633,458, filed Apr. 25, 1967 now Pat. No. 3,459,302.

The present invention relates to the art of filtering solids from liquid waste effluent and more particularly to a method of treating such an effluent having dissolved and/or colloidal substances therein.

The invention is particularly applicable for treating a liquid waste effluent with fine particles of activated carbon as it is being filtered through a filter bed to remove the dissolved and/or colloidal substances within the effluent, and it will be described with particular reference thereto; however, it will be appreciated that the invention has much broader applications and may be used in various other installations wherein a mechanical filtering operation is being performed.

In my prior application there is disclosed a filter structure primarily used as a tertiary mechanical filter for a waste effluent treating system. In accordance with the invention defined therein, flocculent substances which tend to accumulate on the upper surface of the filter bed and, thus, contribute to rapid clogging of the bed is moved upwardly by positive currents created adjacent the upper surface of the filter bed. This type of apparatus has proven highly successful in the tertiary treatment of sewage, and the present invention relates to a method incorporating some of the principles disclosed and claimed in this prior application. Sewage treatment plant effluent after it has received secondary treatment contains a variety of colloidal and dissolved material, such as ammonia, phosphates, nitrates, and sulfates, to mention the most common and detrimental. When such a waste effluent is passed through a particulate mass filter bed of a tertiary mechanical filter, the bed reduces substantially the organic polluting load of the effluent; however, it does not effectively remove these colloidal and/or dissolved substances. These substances present difficulty when being discharged into a receiving body of water. Various government agencies have set certain maximum allowable concentrations for the various colloidal and dissolved substances contained in effluent being discharged into public bodies of water. Consequently, the ever-increasing concentration of colloidal and/or dissolved substances have created an additional waste treatment problem that present treatment techniques have been, generally, unable to solve without the use of relatively expensive equipment, additional space, and high maintenance costs.

Some of the relatively expensive equipment now being used, or proposed for use, utilizes the known capabilities of certain substances to adsorb deleterious colloidal and/or dissolved substances in liquid waste effluent. For instance, activated carbon has been used for removing some of these substances from effluent by employing expensive and inefficiently operating equipment. In accordance with this concept, a slurry of active carbon is introduced into effluent and mixed therewith and then the effluent is passed into a large, low velocity sediment tank. The activated carbon would settle out and the effluent would be removed and then filtered. Of course, this required substantial capital equipment, periodic maintenance of the sediment tank, and a slow rate of reaction with the carbon. A variation of these techniques is to mix activated carbon into the effluent and allow it to settle immediately. This process does not provide sufficient time to use all of the activated carbon. It is also suggested to use carbon columns, including packed activated carbon. In these installations, the surface area of the carbon was substantially decreased and the maintenance of the carbon columns was extremely expensive, since the complete column had to be removed and reactivated periodically. For these reasons, successful use of activated carbon in removing colloidal and/or dissolved substances from liquid, waste effluent, although attempted, has not been satisfactory and has not been widely used in sewage treatment installations.

The present invention relates to a simplified, relatively inexpensive method of utilizing active carbon, or similar adsorptive substances, in removing colloidal and/or dissolved substances from liquid waste effluent in a mechanical tertiary filter. In removal of these substances, it is well known that the effectiveness and speed of the adsorptive process is a function of the surface area and the type of adsorptive carbon particles being used. Primarily, it is a function of the surface area of the particles; therefore, the smaller the particle size the greater the effectiveness of the activated carbon in removing these substances from waste effluent. However, the use of active carbon with a sand bed type of filter has been highly unsuccessful because the active carbon, when particulated to even a generally large size rapidly plugged the sand filter. To overcome this difficulty, it has been suggested to make the whole bed from a large sized particle mass of activated carbon. This is quite expensive, presents backwashing difficulties, and does not present a large surface area for the adsorption process because of the necessary large size of the particles.

The present invention is directed toward a method of treating a liquid waste effluent containing large solids and dissolved and/or colloidal substances. In accordance with this method, a particulate filter bed is used to block the passage of the large solids and, thus remove the heaviest polluting load. An adsorptive material, such as activated carbon having a particle size greater than the interstices of the filter bed is placed in the body of effluent developed above the filter bed, and mechanically created currents are established adjacent the upper surface of the filter bed to maintain the adsorptive particles in suspension in the body of effluent above the bed. In this manner, smaller particle size than heretofore possible can be used above the filter bed to remove the colloidal and/or suspended substances within the waste effluent. Such small particles would rapidly plug the filter bed without the creation of these positive upwardly moving currents within the effluent over the particulate filter bed.

In accordance with another aspect of the present invention, the currents are created by a diffuser for introducing carbon dioxide into the body of effluent above the filter bed. These gases tend to neutralize an effluent having a high pH factor. This presents an even more acceptable effluent for introduction into a body of water.

The primary object of the present invention is the provision of the method of treating liquid waste effluent containing colloidal and/or adsorbed substances, which method utilizes a particulate filter bed and finely divided adsorptive material.

Another object of the present invention is the provision of a method of treating liquid waste effluent, which method employs suspending activated carbon in the effluent above a particulate filter bed.

Another object of the present invention is the provision of a method of treating liquid waste effluent, which method utilizes a diffuser for introducing a reducing gas, such as carbon dioxide above the surface of a particulate filter bed for creating positive upsweeping currents along the filter bed.

Figure 6:
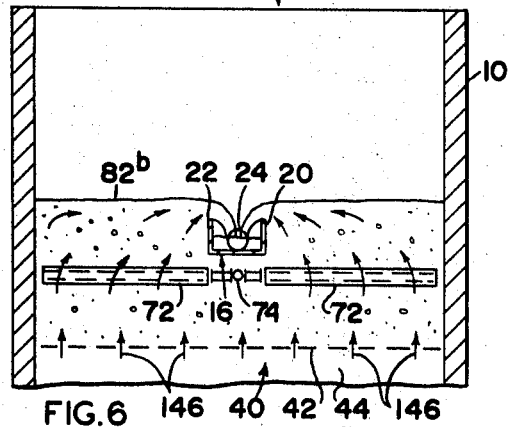
Figure 7:
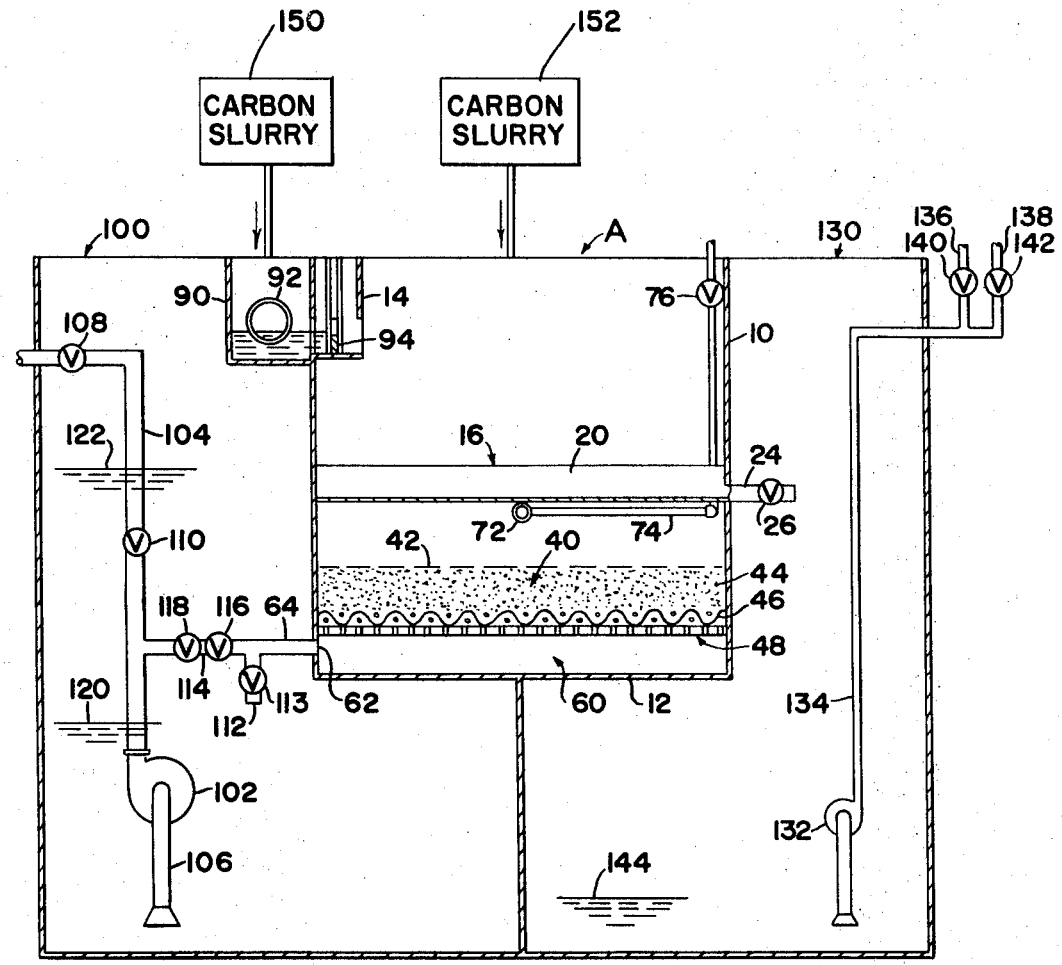

These and other objects and advantages will become apparent from the following description used to illustrate the present invention when taken in connection with the accompanying drawings in which:

FIGS. 1–6 are schematic views illustrating the operating characteristics of the filter to which the present invention is particularly adapted; and, FIG. 7 is a side elevational view, showing somewhat schematically, an apparatus employing the present invention.

Referring now to the drawings wherein the showings are for the purpose of illustrating an apparatus for practicing the preferred embodiment of the invention only and not for the purpose of limiting the same, FIGS. 1–7 show a filtering cell A constructed in accordance with the present invention. This cell includes a filtering tank 10 having a bottom wall 12 and an inlet, generally designated 14. Extending transversely across the tank there is provided a backwash conduit in the form of a generally U-shaped trough 16 having opposed side walls 20, 22. The interior of the trough is communicated with a backwash outlet conduit 24 having an appropriately positioned control valve 26. Directly below the effluent inlet 14 is provided a splash plate 30 against which a stream of effluent 32 impinges to entrap air in the effluent entering the tank 10. The sand filter is designated 40, and it includes an upper filtering surface 42. Referring now more particularly to FIG. 7, the sand filter 40 includes finely divided quartz or similar media 44 which has a uniform particulate size. In some instances, media 44 may be activated charcoal, anthrafil, a mixture of asbsetos or an ion exchange resin for removal of cations or anions. The particle size, in practice, is approximately 0.7 mm.; however, various particulate sizes may be used. Preferably, the quartz or the material 44 has a grain size approximately in the range of 0.3 mm.-0.7 mm. with a uniformity coefficient generally in the range of 1.5. The quartz 44 is supported upon a fine mesh filter element 46 having relatively small openings. When domestic sewage is being treated, element 46 may be formed from bronze or stainless steel. The openings of this filter element are smaller than the particle size of the quartz 44.

The quartz and filtering elements are supported upon a structure 48 having transversely extending bars spaced away from wall 12 by numerous stands, as shown in my prior application. Fluid flows in both directions through the quartz 44 and filter element 46 and the filter element is held in place against the support structure. The filter element 40 is spaced from lower wall 12 to define an under or drain chamber 60 having an outlet or inlet port 62 communicated with an appropriate conduit 64.

Referring now to FIGS. 1–6, the effluent goes through filter 40 in the direction indicated by downwardly directed arrows 68. Arrows 70 indicate circulating currents within the effluent above filter 40, which currents provide an increased filtering action, in a manner to be described later. A diffuser 72 connected onto an inlet 74 having an appropriate valve 76 is positioned above filter 40 and generally perpendicular to trough 16. As air, carbon dioxide or other appropriate gas is directed into the tank 10, bubbles 80 are formed which move upwardly through the effluent and creates the circulating currents indicated by arrows 70. As will be explained later, the effluent has an upper level 82 which rises during the filtering operation and decreases to level 82a in FIG. 5, and level 82b, in FIG. 6, during the backwashing function of the cell A.

Referring now more particularly to FIG. 7, the inlet 14, in practice, includes an inlet channel 90 connected onto a common inlet pipe 92. The inlet pipe 92 interconnects a plurality of cells A so that selective cells may be activated for filtering and for backwashing by appropriate valving on the conduit 92. The variable weir 94 is secured onto channel 90 so that the amount of effluent flowing into the tank 10 varies according to the level of effluent within the channel 90.

To one side, or otherwise spaced from the cell A, is provided a clear fluid or filtrate tank 100 in which is located a pump 102 having an outlet conduit 104 and an inlet conduit 106. A normally open valve 108 is used to control outlet flow of clear fluid from the tank 100. This flow then progresses to a stream or other depository. Proper flow rate is determined by a flow control valve 110 also located within the outlet conduit 104. An outlet 112 is connected to conduit 64 by a normally open valve 113 to provide power backwash from pump 102. There is provided a backwash conduit 114 having a normally closed valve 16 and a flow control valve 118. The pump 102 is adapted to control the level of filtrate within tank 100 between vertically spaced levels 120, 122.

Figure 2:
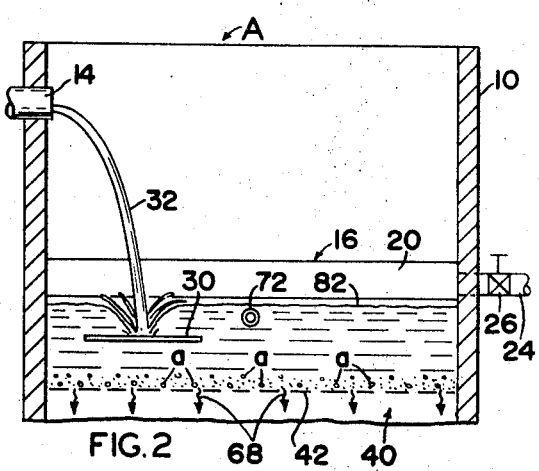

Referring now to the opposite side of cell A, as shown in FIG. 7, there is provided a backwash holding tank 130 which comes into play when valve 26 is open. This backwash holding tank includes a pump 132 having an outlet line 134 selectively connected with outlet conduits 136, 138 by valves 140, 142, respectively. The conduits 136, 138 are directed to various holding sources for receiving the effluent from the holding tank at a rate determined, not by the backwash rate, but by the output rate of pump 132. The level of effluent within tank 130 is designated 144. In operation, waste effluent, represented by stream 32, enters the cell A through inlet 14 and falls by gravity to the splash plate 30. This abruptly changes the direction of the effluent and tends to break up the waste effluent and entrain air therein. Thereafter, the effluent falls by gravity to the upper surface 42 of quartz 44 where large particles $a$, shown in FIG. 1, are retained on the surface 42. These large particles particularly in waste treatment plants of the aerobic spectrum are flocculent materials being macroscopic in size. They cannot move through the filtering material 44. The flocculent material $a$ tends to cover the entire surface 42, as shown in FIG. 2. This causes a substantial increase in the resistance for fluid flow along arrows 68 through the filtering media 44. Consequently, the effluent's surface 82 will rise to overcome the added resistance caused by particles accumulating on surface 42.

Figure 3:
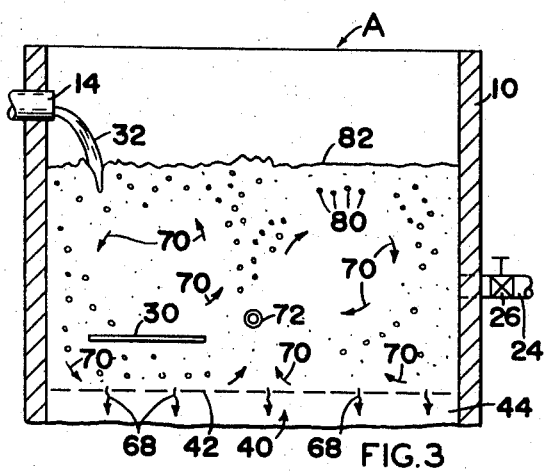

Effluent surface 82 continues to rise, as shown in FIG. 3, and at some predetermined level, over filter media 44 the diffuser 72 commences the discharge of air, carbon dioxide or sulfur dioxide into the effluent. This causes the section of effluent directly over the diffuser to become an admixture of bubbles 80, waste effluent, and suspended solid particles or floc $a$. The specific gravity of this admixture is less than the specific gravity of the surrounding liquid and the incoming effluent because of the gas entrained in the admixture. Consequently, the admixture moves upwardly since it is displaced by the more dense liquid previously mentioned. This constant displacement of a less dense admixture by the more dense liquid creates flow currents 70 in the filtering cell in directions generally indicated by these arrows. Compressed gas supplied through diffuser 72 and inlet 74 may be manually or automatically applied according to the desires of an operator. The rotation of the admixture entrains the flocculent materials a that have come to rest on the upper surface 42. The rate of rotation or movement of the solid materials is a function of the velocity of the admixture. While this is taking place, finer suspended solids will continue to penetrate the filter media 44. This creates additional resistance so that the surface 82 of the effluent within tank 10 continues to rise. When the level reaches that shown in FIG. 5, the cell A is ready for backwash. The first step in backwashing the cell is to open valve 26 in outlet conduit 24. The liquid above the trough 16 is immediately drained by trough 16 to conduit 24 and into the holding tank or mud well 130, shown in FIG. 7.

Figure 4:
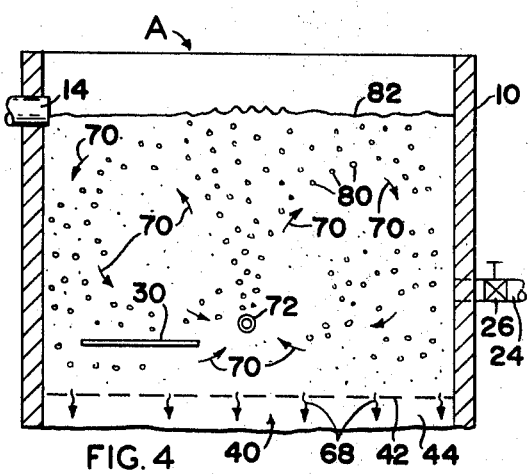
Figure 5:
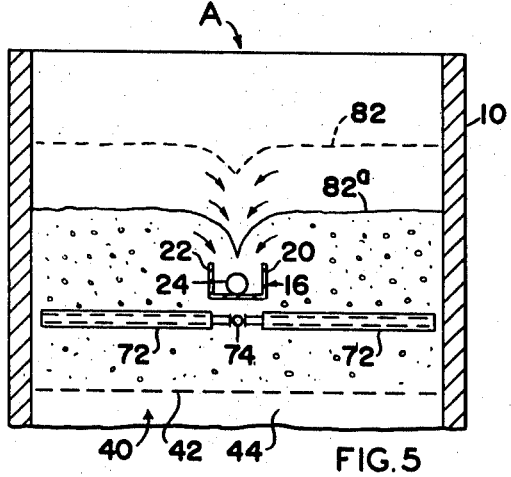

As the surface 82 goes downwardly to a position 82b, as shown in FIG. 6, the filter media 44 is ready for backwashing. During the prior filtering operation, tank 100 was filled with a clear filtrate which passed through outlet 112. Valves 108, 113 are closed and valve 116 opened. The pump 102 then pumps the filtrate through conduit 64 into chamber 60. The filtrate then flows in a uniform direction indicated by the arrows 146 in FIG. 6 through the filtering element 40 and into the backwash trough 16. This process is continued until the washing action of the media 44 is completed. In practice, this requires approximately five minutes. Generally, the level of fluid within tank 100 is maintained at level 120. The pump 102 is energized when the filtrate reaches the upper level 122. The pump 102 operates alternately changing the filtrate level between 120, 122 until the effluent level 82 reaches its maximum upper limit as shown in FIG. 4.

As previously mentioned, when backwashing is required the liquid in cell A is drained through trough 16, in a manner previously described. During the backwashing, the filtrate passes upwardly from chamber 60 to the media 44 which expands the granular quartz 44 and carries the embedded fine particles in the quartz upwardly to the trough 16. From there, these particles are deposited in the holding tank 130. During this backwashing, valve 76 may be closed so that further agitation of the upper effluent does not take place as the effluent flows, by laminar flow, to the trough 16.

This action raises the level 144 of the admixture within tank 130; therefore, pump 132 is actuated. The backwashing rate is a function of the size of particles forming the media 44. This is often as high as fifteen times the downwardly filtering rate and may be substantially higher. This backwash rate creates a large volume of liquid flow into trough 16, and it should not be directed into subsequent treatment plants at this high backwash rate. This high flow rate would upset the normal flow patterns of conventional waste treatment plants. The holding tank 130 can accept the admixture at the backwash rate, and pump 132 provides a controlled, lower rate for pumping the admixture to drying beds, sludge holding tanks, or further processing equipment through the conduits 136, 138. Pump 132 continues to operate until the admixture within tank 130 is reduced to a sufficiently low level for subsequent backwashing action. Pump 102 continues to force filtrate through the filter media 44 until the backwash is completed, which may be controlled manually, automatically or by the limitation of the volume of filtrate within the tank 100. This completes the general operation of the filter to which the present invention is directed.

In accordance with one aspect of the present invention, carbon dioxide ($CO_2$) is introduced into the body of effluent above filter 40 by passing from diffuser 72. As in the case of air, the carbon dioxide creates the positive currents tending to lift the large flocculent particles from the surface of the filter; however, carbon dioxide performs the additional function of forming carbonic acid ($H_2CO_3$) which will neutralize an effluent having a high pH factor. By introducing a reducing gas into the effluent body above the filter, an effluent having a high nitrate content can be denitrified to expel nitrogen gas. The removal of nitrates is also advantageous in sewage treatment. Various reducing gases could be used.

Referring now to FIG. 7, a slurry formed from an adsorptive substance, such as active carbon, is introduced into the body of effluent above the filter 40 through either a device 150 at the inlet channel 90 or a device 152 communicated with tank 10. The action of the adsorptive material will be described with respect to the preferred substance, i.e. active or activated carbon. As is known, active carbon increases the effectiveness as the surface area increases. For this reason, active carbon is usually finely divided to increase its adsorptive action. If a large 1 cm. cube of active carbon were used, the surface area would be only 6 cm.$^2$. However, if the carbon is ground to pass through an 8 x 30 screen, the surface area is in the neighborhood of 1000 m.$^2$/gram.

In accordance with the preferred embodiment of the present invention, the active carbon is substantially reduced below the size to pass through an 8 x 30 screen, and it is preferred that the particle size shall be on the order of 15-20 microns. This size gives the largest possible surface area without entering the interstices of the bed 40 and plug the same. It is contemplated that the size could be increased to 400 microns to optimize the inability to pass into the bed 40 and still have a surface area of greater than 850 m.$^2$/gram. The particular preferred grain size for the carbon is 15-400 microns, which is between the particle size generally known as powder (8-10 microns) and the size generally known as granular (above about 500 microns). The activated carbon shall have a size to prevent substantial entrance of the carbon particles into the filter bed with the upper limit being only the size which will produce rapid adsorption by the active carbon. Although it is preferred to use an active carbon below granular size, some granular sized material on the low range of granular (i.e. about 500 microns) can be used. West Virginia Pulp and Paper markets active carbon under the tradenames Nuchar WV-1 8 x 30 and Nuchar WV-W 8 x 30, and this material may be employed. This material is designated "granular" (it will pass through an 8 x 30 screen) and has a surface area of 1000 m.$^2$/gram and 850 m.$^2$/gram; respectively, with iodine Nos. 950 and 850 respectively.

When the active carbon is introduced into the tank 10, it would rapidly plug the filter were it not for the diffuser 72 which creates positive currents tending to raise the low density carbon particles and prevent their accumulation on the filter surface. The quartz 44 has a higher density than the carbon and is not raised by the currents holding the carbon in suspension in the effluent. In a short time, determined by the surface area of the carbon particles the reaction of the carbon has been completed. During this time, the motion created by the diffuser maintains the particles in equilibrium in the effluent. These particles remove the deleterious dissolved and/or colloidal substances to clean the effluent even more than can be done with the particulate filter bed alone. No expensive equipment is necessary and there are no critical maintenance problems created.

Having thus described my invention, I claim:
1. A method of treating liquid waste effluent containing large solids and dissolved and/or colloidal substances, said substances being susceptible to adsorption by an adsorptive material, such as activated carbon, said method comprising the steps of:
   (a) providing a particulate filter bed with an upper surface and adapted to block flow of said solids, said bed having a given interstices passage size and a selected density;
   (b) developing a body of said effluent above said surface;
   (c) providing adsorptive material in particulate form with a particle size greater than said interstices passage size in said body of effluent above said surface, said material having a density less than said selected density; and, (d) mechanically creating positive currents which sweep over said surface and tend to maintain said absorptive material in suspension in said body and above said surface.

2. The method as defined in claim 1 wherein said adsorptive material is activated carbon.

3. The method as defined in claim 2 wherein said active carbon has a particle form with at least 850 square meters of surface per gram of such material.

4. The method as defined in claim 3 wherein said active carbon has a particle form with at least 1100 square meters of surface per gram of such material.

5. The method as defined in claim 1 wherein said particle size is at least 10 microns.

6. The method as defined in claim 5 wherein said particle size is in the approximate range of 15–20 microns.

7. The method as defined in claim 5 wherein the particle size is no greater than 400 microns.

8. The method as defined in claim 1 wherein said mechanically creating step includes introducing gaseous carbon dioxide into said body above said surface.

9. The method as defined in claim 1 wherein said mechanically creating step includes introducing neutralizing gas into said body above said surrface.

10. The method as defined in claim 1 wherein said mechanically creating step includes introducing reducing gas into said body above said surface.

11. A method for removing solids from waste effluent, having large particles, said method comprising the steps of:

(a) providing a particulate filter bed with an upper surface and adapted to block flow of said large particles;

(b) developing a body of said effluent above said surface; and, (c) mechanically creating positive currents which sweep over said surface while said effluent is being filtered for lifting said large particles from said surface by introducing a reducing gas into said body.

12. A method for removing solids from waste effluent, having large particles, said method comprising the steps of:

(a) providing a particulate filter bed with an upper surface and adapted to block flow of said large particles;

(b) developing a body of said effluent above said surface; and, (c) mechanically creating positive currents which sweep over said surface while said effluent is being filtered for lifting said large particles from said surface by introducing carbon dioxide gas into said body.

13. A method for removing solids from waste effluent, having large particles, said method comprising the steps of:

(a) providing a particulate filter bed with an upper surface and adapted to block flow of said large particles;

(b) developing a body of said effluent above said surface; and (c) mechanically creating positive currents which sweep over said surface while said effluent is being filtered for lifting said large particles from said surface by introducing neutralizing gas into said body.

References Cited
UNITED STATES PATENTS

| | | | |
|---|---|---|---|
| 782,021 | 2/1905 | Friberg | 210—59 X |
| 1,782,850 | 11/1930 | Hill | 210—32 |
| 2,227,520 | 1/1941 | Tiger | 210—32 |
| 3,027,321 | 3/1962 | Selm et al. | 210—59 |
| 3,111,485 | 11/1963 | Kunin | 210—32 |

JOHN W. ADEE, Primary Examiner

U.S. Cl. X.R.

210—34, 36, 59, 73, 80